United States Patent [19]

Eastwood et al.

[11] 4,183,893

[45] Jan. 15, 1980

[54] METHODS OF PRODUCING ORIENTED HIGH DENSITY POLYETHYLENE

[75] Inventors: Michael C. Eastwood, Northolt; Norman E. King, London, England

[73] Assignee: Metal Box Limited, Berkshire, United Kingdom

[21] Appl. No.: 927,410

[22] Filed: Jul. 24, 1978

[30] Foreign Application Priority Data

Jul. 22, 1977 [GB] United Kingdom .............. 30913/77

[51] Int. Cl.$^2$ .............................................. B29C 17/02
[52] U.S. Cl. ................................................. 264/288.4
[58] Field of Search .............. 264/288, 289, DIG. 73, 264/210 R

[56] References Cited

U.S. PATENT DOCUMENTS

| | | | |
|---|---|---|---|
| 2,547,763 | 4/1951 | Land et al. | 264/288 |
| 3,141,912 | 7/1964 | Goldman et al. | 264/209 |
| 3,396,216 | 8/1968 | Yumoto et al. | 264/288 |
| 3,962,205 | 6/1976 | Ward et al. | 264/288 |

FOREIGN PATENT DOCUMENTS

591604 1/1960 Canada .................... 264/288

*Primary Examiner*—James B. Lowe
*Attorney, Agent, or Firm*—Burns, Doane, Swecker & Mathis

[57] ABSTRACT

In a method of producing uniaxially oriented polymer material, particularly a uniaxially oriented film, from a high density polyethylene, in which the material is put under tension and is drawn from a transverse heated portion with a draw ratio of 5:1 or higher (preferably 7:1 to 20:1), the drawing temperature is selected to be between 80° C. and 110° C., and preferably below 105° C., whereby excellent gas barrier characteristics are obtained in the drawn material.

7 Claims, 6 Drawing Figures

FIG.6

METHODS OF PRODUCING ORIENTED HIGH DENSITY POLYETHYLENE

BACKGROUND OF THE INVENTION

1. Field of the Invention

This invention relates to methods of producing oriented polymer material, particularly oriented film of high density polyethylene.

2. Description of the Prior Art

It is known that, by drawing a high density polyethylene sheet material at a temperature below its melting point to a draw ratio of, for example, 5:1 to 10:1, it is possible to produce an oriented polymer film having useful properties of transparency and high tensile strength in the direction of draw, as well as crease retention in some cases.

Commercially available films of this type, however, have gas barrier characteristics which are no better than those of the undrawn polyethylene sheet material.

SUMMARY OF THE INVENTION

It is an object of the invention to provide a method of preparing such an oriented polymer material with improved gas barrier characteristics.

The present invention resides in a method of producing a uniaxially oriented polymer material, in which a high density polyethylene having a density of 0.94 gm/cm$^3$ or higher is subjected to a drawing tension, and a portion extending across the polyethylene material transversely to the drawing direction is heated to induce drawing to take place preferentially in or adjacent to the heated transverse portion, the drawing tension being controlled to draw out the polyethylene material with a draw ratio of 5:1 or higher, wherein the temperature of the heated transverse portion is selected to be in the range from 80° to 110° C.

The method is particularly applicable to the production of oriented polyethylene films, but it can also be applied to the production of oriented tapes or fibres produced by slitting or fibrillating the polyethylene before or after drawing, or to the production of oriented fibres or monofilaments by drawing spun fibres.

It has surprisingly been found that, by selection of a drawing temperature in the above range, excellent gas barrier characteristics can be obtained in the drawn material, and these characteristics are believed to be accomplished by greatly improved resistance to weathering. At higher drawing temperatures, the gas barrier characteristics have been found to deteriorate with increasing sharpness, to such an extent that the gas barrier can become significantly less than that of the undrawn material, when using drawing temperatures which are still well below the melting point of the high density polyethylene, which is around 134° C. With drawing temperatures only slightly above 110° C. the gas barrier may in some cases still be reasonably good, especialy with a high draw ratio, but one is then working in an area where the gas barrier is beginning to deteriorate and slight changes in the conditions may cause major deterioration in the quality of the product. To obtain a controllable improvement in accordance with the invention, we have found the maximum drawing temperature to be 110° C. Best results have been obtained at 105° C. and below. Although use of drawing temperatures below 80° C. seems likely to produce good gas barrier characteristics, such temperatures are not desirable because the material produced tends to be less clear, and more energy is required to carry out the drawing process.

The dependence of the gas barrier on the temperature of drawing is a surprising discovery, but it has been found to apply for films of high density polyethylene produced at a wide range of draw ratios above 5:1. High draw ratios, however, about 20:1, tend to produce oriented materials which have exceptionally high modulus and which may consequently be unsuitable for some purposes. Also the drawing process can become somewhat cumbersome with such high draw ratios, especially when drawing wide film, and it is difficult to control the dissipation of heat generated in the material in the drawing process. At low draw ratios below 7:1, although the gas barrier obtained at lower drawing temperatures is better than that obtained at high drawing temperatures, it is nevertheless not very good and the other characteristics of the film are not so attractive.

The range of drawing temperatures used in accordance with the invention thus lies between 80° C. and 110° C., while it is believed that the best results will be obtained in the range from 80° C. to 105° C. The preferred range of draw ratios lies between 7:1 and 20:1.

In practising the invention, to produce an oriented polymer film from a polyethylene sheet material, the polyethylene sheet material is preferably transported continuously between responsive sets of tensioning and drawing rollers, past a heating device which heats the transverse portion. The transverse portion of the sheet material may be heated by being passed around a part of the circumference of a fixed metal tube or drum which is heated internally. The tube or drum may be heated by passing a heated liquid through it. Alternatively, the transverse portion of the sheet material may be heated by being passed around a part of the circumference of a hollow metal roller which is heated internally. A series of heated rollers may be used.

In another alternative, the transverse portion of the sheet may be heated by passing it through a heated bath of liquid, between the tensioning and drawing rollers.

In this specification, where reference is made to the drawing temperature, we mean the temperature of the polyethylene immediately before it is drawn, e.g. the temperature to which it is heated by the heated tube, drum, roller or bath mentioned above, although the temperature of the polyethylene may exceed this value momentarily due to the heat produced by the drawing process.

DETAILED DESCRIPTION OF THE INVENTION

Figure 1:
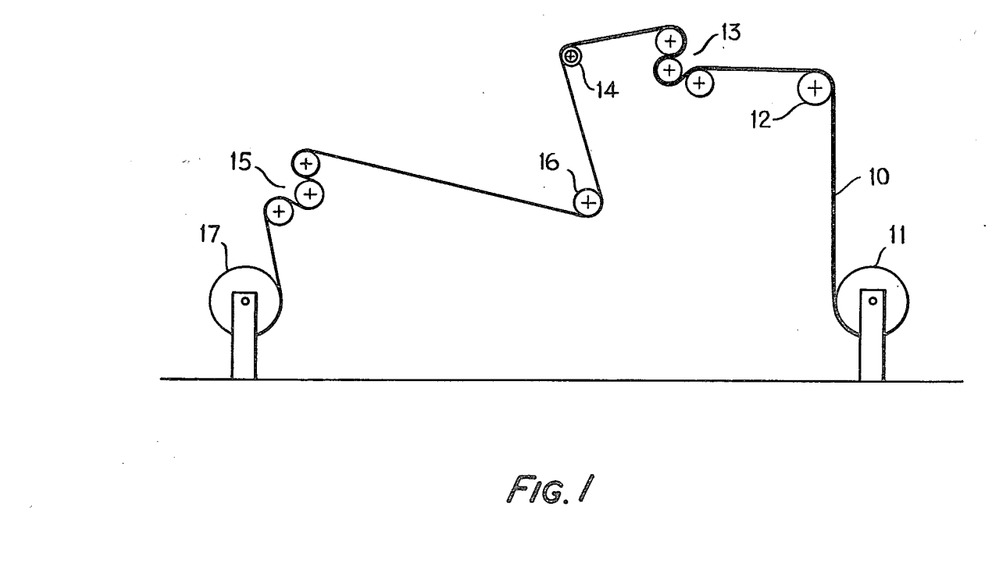
FIG. 1 is a diagrammatic elevation of an apparatus for carrying out the drawing operation.

Samples of various grades of high density polyethylene having densities above 0.94 gm/cm³ were formed into thin sheet material and wound into rolls in known manner, and subsequently drawn into oriented films using the apparatus of FIG. 1.

In this apparatus, the sheet material 10 is fed from a roll 11 over a roller 12 and through a set of tensioning rollers 13, and then passes around a part of the circumference of a fixed hollow metal tube 14 which is heated internally by passing hot oil through it. The tube 14 may be of aluminium or other metal which conducts heat well, and it may be of 10 cm diameter of example. The angle of wrap-around of the sheet material on the tube 14 may be substantially 90°, as shown. A portion of the sheet material extending across it from edge to edge is thus heated to induce drawing to occur at or adjacent to the heated portion. The angle of wrap-around can be varied to control the heating of the sheet material. The drawn and oriented film is taken off through a set of drawing rollers 15, via another roller 16, and wound on a spool or drum 17. The drawing takes place as the sheet material passes around the tube 14 or as it leaves the tube 14 and passes around the roller 16, and before it reaches the drawing rollers 15.

In place of the heated tube 14, a fixed drum of larger diameter may be employed, or an internally heated roller or a series of heated rollers. Alternatively, heating could be effected by passing the sheet material through a bath of heated liquid in which the drawing tension is applied to it.

Instead of feeding the sheet material from the roll 11, it would be possible to extrude the sheet material and feed it directly, or through a quenching tank, from the extruder to the tensioning rollers 13.

Figure 2:
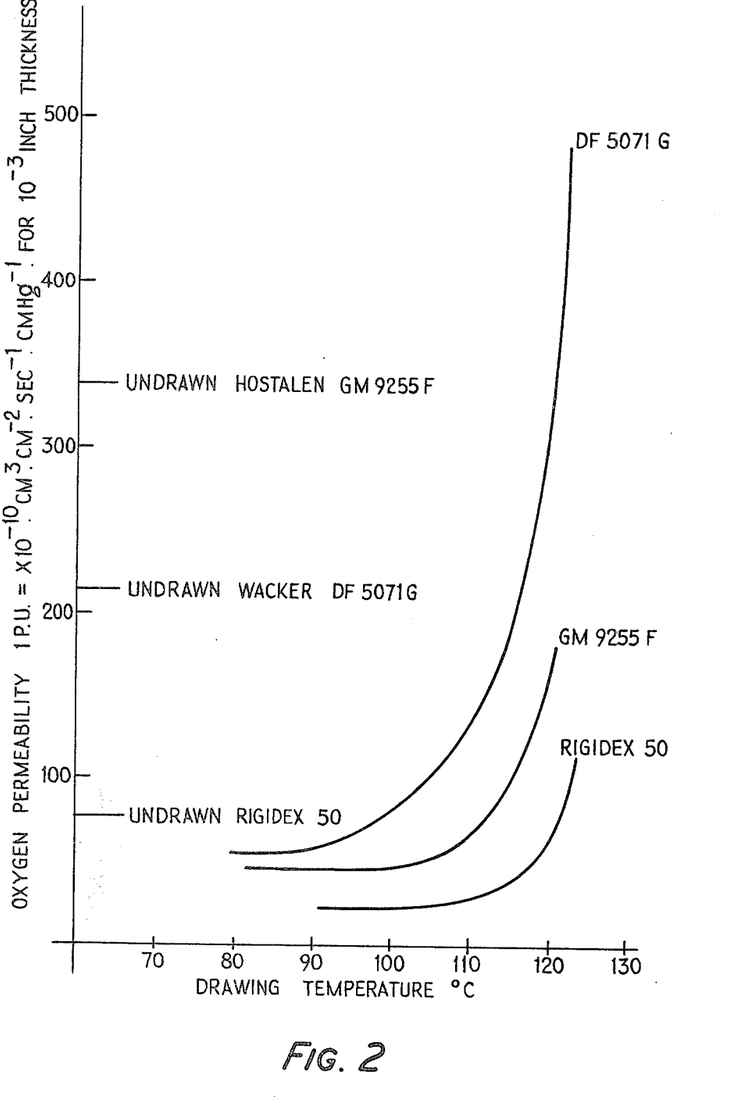
FIG. 2 is a graph showing variation of gas barrier characteristics against drawing temperature when samples of three different grades of high density polyethylene are drawn under otherwise similar conditions.

Samples of each high density polyethylene material were drawn at different temperatures by varying the temperature of the oil passing through the tube 14. The drawing temperature was measured by means of a thermocouple in contact with the exterior surface of the tube 14 and the oxygen barrier characteristics of the resulting films were measured in known manner. In a first series of experiments whose results are indicated in FIG. 2, the following three grades of high density polyethylene were used, drawn to similar draw ratios in each case:

(1) DF 5071G sold by Wacker-Chemie
  Density: 0.952 g.cm³
  Melt index MFI 190°/5:0.40
  Weight average molecular weight $\overline{M}_w$: 196,000–250,000
  Draw ratio 7.5:1.
(2) HOSTALEN GM 9255F sold by Hoechst
  $\overline{M}_w$: 305,000
  Draw ratio: 8:1.
(3) RIGIDEX 50 sold by B. P. Chemicals Ltd
  $\overline{M}_w$: 90,000–100,000
  Draw ratio: 8.5:1.

Drawing speed was 6 feet per minute in each case. The results of this series of experiments are illustrated graphically in FIG. 2, in which the gas barrier characteristic, namely the permeability of the film to oxygen expressed as $\times 10^{-10} cm^3 \cdot cm^{-2} \cdot sec^{-1} \cdot cmHg^{-1}$ for one thousandth inch thickness, is plotted against the temperature of the drawing tube 14. FIG. 2 also illustrates the gas barrier values found for the undrawn materials. It will be understood that the values for the undrawn materials are typical values within the wide ranges normally found in undrawn materials. It will be seen that the gas barrier characteristics deteriorated with increasing sharpness with increased drawing temperature. When the drawing temperature was around 120° C., which is well below the melting point (134° C.) of the polyethylene, the gas barrier was in two cases little better than that of the undrawn material, but reduction of the drawing temperature to 115° C. produced an improvement. At 110° C. the gas barrier was further improved and the slope of the curve was flatter, so that results should be easily reproducible. Best results were obtained with drawing temperatures below 105° C. No appreciable benefit appeared to be achieved by reduction of drawing temperature below 90° C., and at temperatures lower than 80° C. the resulting film showed a tendency to lose clarity and become cloudy, while the energy required to carry out the drawing process became inconveniently high.

Figure 3:
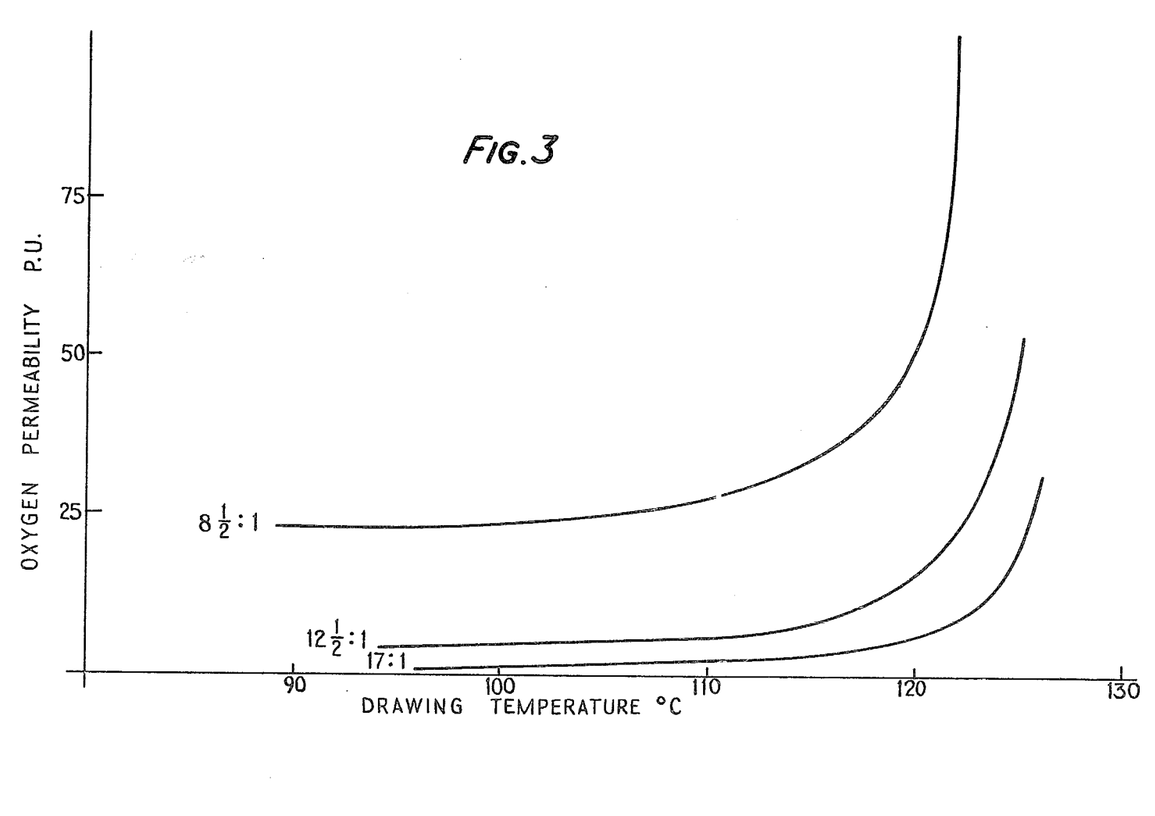
FIG. 3 is a graph showing variation of gas barrier with drawing temperature for three samples of one grade of high density polyethylene drawn to different draw ratios.

FIG. 3 illustrates results obtained with three different samples of a high density polyethylene (RIGIDEX 50 produced by B.P. Chemicals Limited) drawn to three different draw ratios of 8½:1, 12½:1 and 17:1. As would be expected, the higher the draw ratio the better the gas barrier characteristic, but at all three draw ratios it is evident that operation at drawing temperatures of 110° C. and below produced greatly improved and reproducible gas barrier characteristics as opposed to films drawn at higher drawing temperatures.

Figure 4:
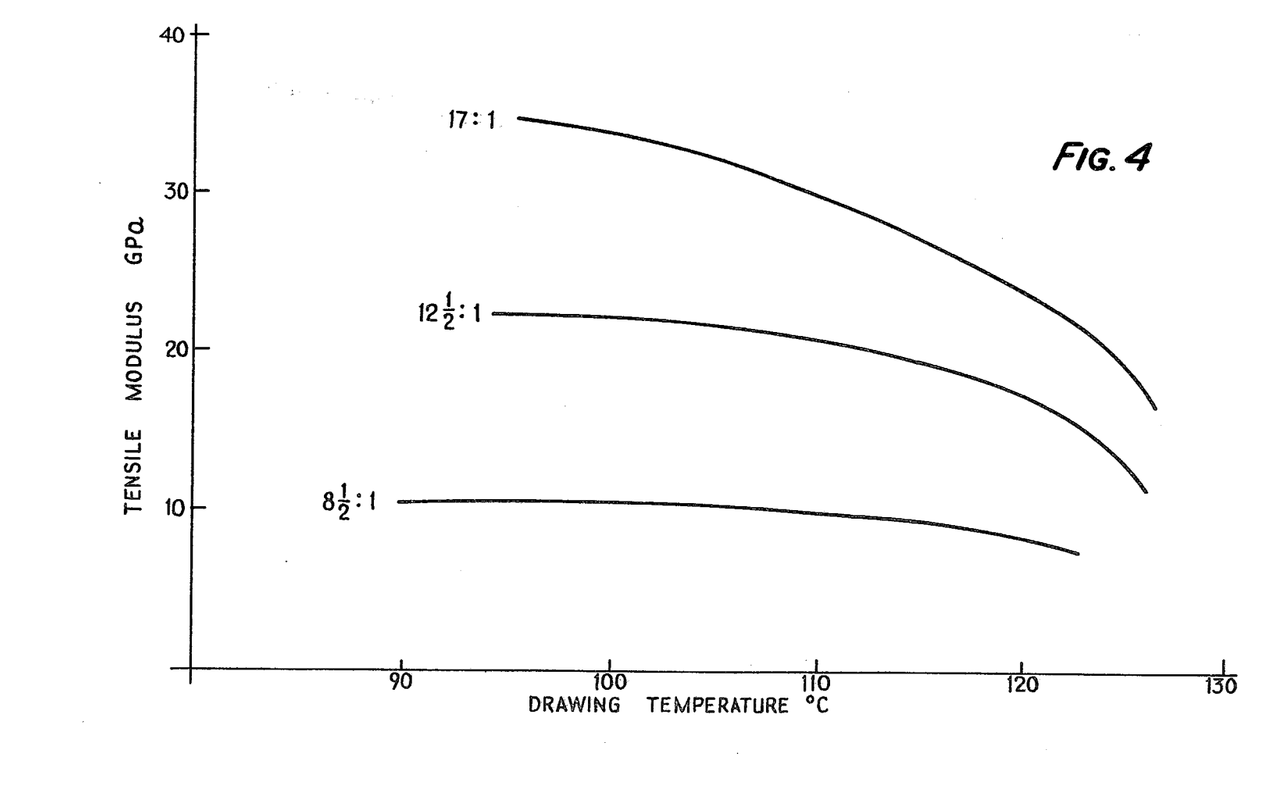
FIG. 4 is a graph showing variation of tensile modulus with drawing temperature for the same three samples as FIG. 3.
Figure 5:
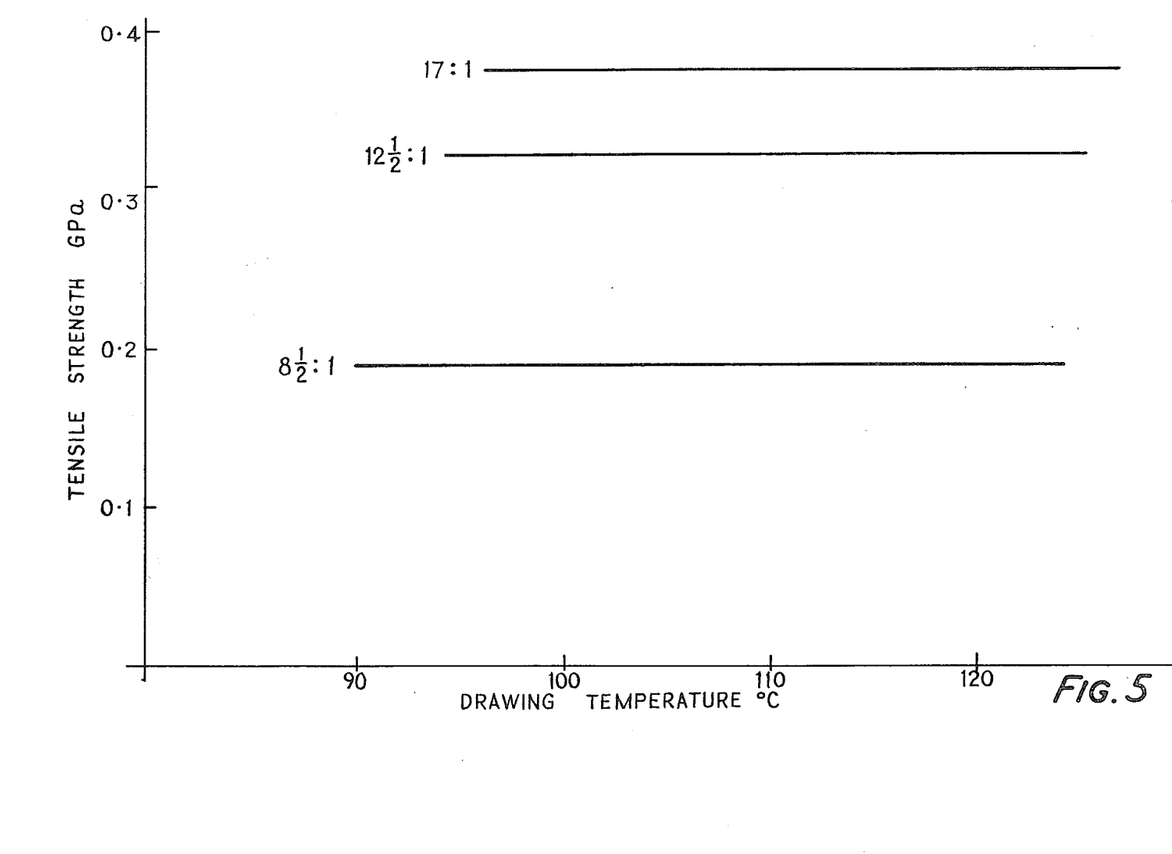
FIG. 5 is a graph showing variation of tensile strength with drawing temperature for the same three samples as FIGS. 3 and 4.

FIGS. 4 and 5 illustrate the results of measurements of tensile modulus and tensile strength on the samples of FIG. 3. It will be seen that tensile modulus was higher for the films drawn at lower draw temperatures, particularly in the case of the film drawn to a high draw ratio of 17:1. The temperature of drawing appeared to have no significant effect on the tensile strength of the film.

Figure 6:
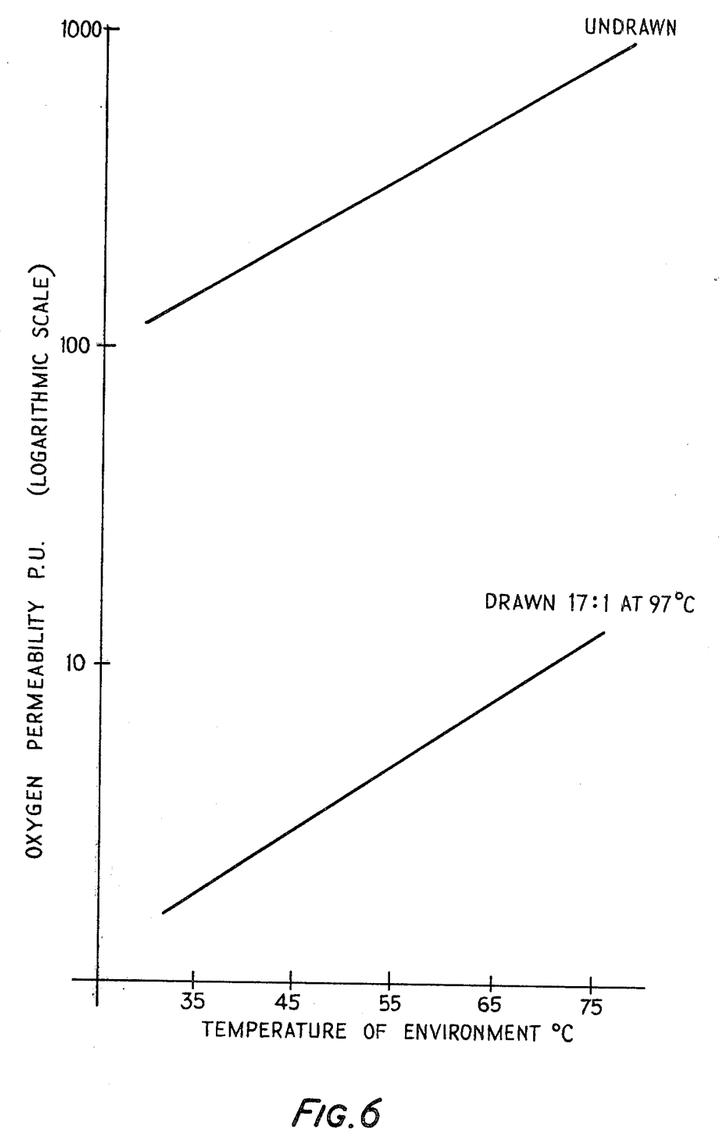
FIG. 6 illustrates the variation of the gas barrier characteristics with the temperature of their environment of two samples of high density polyethylene, one undrawn and one drawn in accordance with the invention.

Measurements were also made with the same grade of high density polyethylene (RIGIDEX 50) to ascertain the variation of the gas barrier characteristic with the temperature of environment of the material, both for an undrawn sample and for a sample drawn to a draw ratio of 17:1 at a drawing temperature of 97° C. The results are illustrated in FIG. 6, which shows that while the gas barrier tended to fall, i.e. the permeability rose, as the temperature of the environment rose, there was no significant change in the rate of fall of the gas barrier characteristic with temperature.

As indicated above, the drawing temperatures referred to are the temperature of the heated drawing tube 14, measured by means of a thermo-couple in contact with the surface of the tube, and this is effectively the temperature of the high density polyethylene at the instant before drawing takes place. To ascertain the relationship of this temperature to the temperature of the polymer in the surface of the neck region during the actual drawing process measurements were made of the temperature of the surface of the polymer in the neck region using an infrared thermometer. For a series of samples of RIGIDEX 50, drawn at a draw ratio of 8.5:1, the following values of draw tube temperature and corresponding polymer temperature was measured.

| Temperature °C. of draw tube surface using Chrome/Alumel thermocouple | Temperature °C. of polymer in surface of neck region using infrared thermometer |
| --- | --- |
| 90 | 96–100 |
| 97 | 101 |
| 106 | 104 |
| 113 | 114 |
| 118 | 119 |

It will be seen that, particularly at lower drawing temperatures, the temperature of the polymer in the neck region is slightly higher than that of the surface of the draw tube, due to the work done in effecting the drawing process. At the maximum drawing temperature of 110° C. in accordance with the present invention, however, the temperature reached by the polymer was only very slightly above the temperature of the draw tube.

As mentioned above, it is believed that the improvement in gas barrier characteristics produced by the present invention is also reflected in improved weathering characteristics of the drawn material. A set of samples of RIGIDEX 50 high density polyethylene, drawn at a draw ratio of 12:1 at a draw temperature of 95° C. and draw speed of 20 feet per minute were subjected to weathering tests by exposure to the weather on the roof of a building in London for eighteen months continuously, with a control batch of undrawn samples, and then compared with unexposed samples drawn under the same conditions and with unexposed undrawn samples. The samples were subjected to tests of tensile strength and extension to break and were investigated by infrared scanning for evidence of oxidation peaks which would indicate structrual breakdown of the material. The results are set out in the following table:

| Draw Ratio | Weathering | Tensile Strength (GPa) | Extension to break (%) | I.R. Oxidation Peak |
| --- | --- | --- | --- | --- |
| 12 | 18 months | .24 | 9.6 | no |
| 12 (control) | none | .25 | 9.5 | no |
| undrawn | 18 months | .017 | 2.8 | yes |
| undrawn (control) | none | .024 | 14.7 | no |

The results indicate that the material which was drawn in accordance with the present invention suffered negligible deterioration compared with the unexposed drawn control, whereas the undrawn exposed material was seriously affected by the exposure.

Further improvements in weathering resistance may be obtainable by incorporation of materials such as carbon black which are known to have protective qualities.

Although the measurements of gas barrier referred to above relate to the permeability of the material to oxygen, tests have shown similar improvements in the permeability to water vapour, helium and hydrogen. With films drawn from Wacker DF 5071G polyethylene at 90° to 95° C., the following results were found for water vapour permeability.

| film | Water Vapour Permeability (gm.m$^{-2}$.24h$^{-1}$ for one thousandth inch thickness) |
| --- | --- |
| Undrawn | 0.89 |
| Draw Ratio 8:1 | 0.25 |
| Draw Ratio 10.5:1 | 0.12 |
| (Competitive Drawn polyethylene for comparison) | 0.80 |

Another sample of RIGIDEX 50 drawn to a draw ratio of 20:1 at 80° C. was tested for both oxygen and helium permeability with the following results:

| Drawn material: | $O_2$ | 0.2 permeability units |
| --- | --- | --- |
|  | He | 11 permeability units |
| Undrawn material: | $O_2$ | 75 permeability units |
|  | He | 700 permeability units |

The permeability units in which the gas barrier characteristic was measured were the same as those referred to above in connection with FIGS. 2, 3 and 6. Except in the case of those illustrated in FIG. 6, all measurements of gas barrier characteristic referred to in this specification were made at an environmental temperature of 25° C.

Finally, to investigate the effect (if any) of drawing speed, tests were made at a constant drawing temperature of 88° C. and drawing speeds from 6 feet per minute to 120 feet per minute. No appreciable variation of the gas barrier characteristic with drawing speed was found.

The improved gas barrier and weathering resistance of the materials obtained in accordance with the present invention are believed to be accomplished by improved resistance to chemical attack and to swelling in oils and solvents.

Thus by operating at draw ratios of 5:1 and above (preferably between 7:1 and 20:1) and drawing temperatures between 80° C. and 110° C. (preferably between 80° C. and 105° C.), oriented polymer films having unexpectedly high gas barrier characteristics as well as other useful properties can be obtained.

We claim:

1. A method of producing a uniaxially oriented polymer film, in which a high density polyethylene sheet material having a density of 0.94 gm/cm$^3$ or higher is transported continuously between respective sets of tensioning rollers and drawing rollers and is heated by passing it around a part of the circumference of a tubular metal heating member which is heated internally and is disposed in the atmosphere transversely to the drawing direction between the respective sets of rollers, whereby to heat a portion of the sheet material extending transversely across the full width of the sheet material and to induce drawing of the polyethylene sheet material to take place preferentially in or adjacent to the heated transverse portion, the drawing tension being controlled to draw out the polyethylene sheet material with a draw ratio of 5:1 or higher, and the temperature of the heated portion being selected to be in the range of 80° C. to 110° C.

2. A method according to claim 1, wherein the heating is controlled to maintain the temperature of the heated transverse portion in the range from 80° C. to 105° C.

3. A method according to claim 1, wherein the draw ratio is between 7:1 and 20:1.

4. A method according to claim 1, wherein the tubular metal heating member is heated by passing a heated liquid through it.

5. A method according to claim 1, wherein a fixed metal tube or drum is used as the tubular metal heating member.

6. A method according to claim 1, wherein a hollow metal roller is used as the tubular metal heating member.

7. In a method for producing a uniaxially oriented high density polyethylene film wherein the film is continuously transported in a longitudinal direction through a drawing zone between respective sets of tensioning rollers and drawing rollers and drawing is induced in the longitudinal direction in the zone at elevated temperatures, the improvement comprising passing a high density polyethylene sheet material extending in the longitudinal direction and transverse thereto and having a density of 0.94 gm/cm$^3$ or higher through a drawing zone consisting of at least one tubular heating member heated internally and disposed transversely to the drawing direction between the respective sets of rollers, the material continuously passing into contact with the tubular heating member and being heated, the sheet material in contact with the tubular heating member being heated transversely across from edge to edge to a temperature of from 80° C. to 110° C. to induce longitudinal drawing preferentially in and adjacent to the transversely heated material in contact with the tubular heating member, the drawing being controlled to give a draw ratio of 5:1 or higher and to impart improved gas barrier and weathering resistance characteristics to the high density polyethylene material.

* * * * *